(12) United States Patent
Danner et al.

(10) Patent No.: US 9,152,003 B2
(45) Date of Patent: Oct. 6, 2015

(54) ELECTRO-OPTIC DISPLAY WITH EDGE SEAL

(75) Inventors: Guy M. Danner, Somerville, MA (US); Shamus Ford Patry, Vernon, CT (US); Charles Howie Honeyman, Roslindale, MA (US); Thomas H. Whitesides, Victoria (CA); Michael D. McCreary, Acton, MA (US); Gregg M. Duthaler, Needham, MA (US)

(73) Assignee: E Ink Corporation, Billerica, MA (US)

( * ) Notice: Subject to any disclaimer, the term of this patent is extended or adjusted under 35 U.S.C. 154(b) by 445 days.

(21) Appl. No.: 13/205,143

(22) Filed: Aug. 8, 2011

(65) Prior Publication Data

US 2011/0292493 A1    Dec. 1, 2011

Related U.S. Application Data

(60) Division of application No. 12/607,197, filed on Oct. 28, 2009, now Pat. No. 8,027,081, which is a division of application No. 11/612,732, filed on Dec. 19, 2006, now Pat. No. 7,649,674, which is a (Continued)

(51) Int. Cl.
*G02B 26/00* (2006.01)
*G02F 1/03* (2006.01)

(Continued)

(52) U.S. Cl.
CPC .............. *G02F 1/167* (2013.01); *G02F 1/0107* (2013.01); *G02F 1/155* (2013.01); *G02F 1/161* (2013.01); *G02F 1/1339* (2013.01); *G02F 1/133305* (2013.01); *G02F 2201/50* (2013.01)

(58) Field of Classification Search
CPC ............................. G02F 1/167; G02F 2201/50
USPC ................. 359/245, 296, 248, 254, 265–275; 345/105, 107
See application file for complete search history.

(56) References Cited

U.S. PATENT DOCUMENTS 3,668,106 A   6/1972  Ota
3,756,693 A   9/1973  Ota (Continued)

FOREIGN PATENT DOCUMENTS

DE      101 32 893        1/2003
EP      1 099 207 B1      3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Tuyen Tra
(74) *Attorney, Agent, or Firm* — David J. Cole

(57) ABSTRACT

Various types of edge seals for protecting electro-optic displays against environmental contaminants are described. In one type of seal, the electro-optic layer is sandwiched between a backplane and a protective sheet and a sealing material extends between the backplane and the protective sheet. In other seals, the protective sheet is secured to the backplane or to a second protective sheet adjacent the backplane. The electro-optic layer can also be sealed between two layers of adhesive or between one layer of adhesive and the backplane. Other seals make use of flexible tapes extending around the periphery of the display.

11 Claims, 15 Drawing Sheets

Related U.S. Application Data continuation-in-part of application No. 10/907,065, filed on Mar. 18, 2005, now Pat. No. 7,236,292, which is a division of application No. 10/249,957, filed on May 22, 2003, now Pat. No. 6,982,178.

(60) Provisional application No. 60/319,300, filed on Jun. 18, 2002, provisional application No. 60/320,186, filed on May 12, 2003.

(51) Int. Cl.
| | | |
|---|---|---|
| *G02F 1/167* | (2006.01) | |
| *G02F 1/161* | (2006.01) | |
| *G02F 1/01* | (2006.01) | |
| *G02F 1/155* | (2006.01) | |
| *G02F 1/1333* | (2006.01) | |
| *G02F 1/1339* | (2006.01) | |

(56) References Cited

U.S. PATENT DOCUMENTS

| | | |
|---|---|---|
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 4,640,583 A | 2/1987 | Hoshikawa et al. |
| 5,606,194 A | 2/1997 | Lebrun et al. |
| 5,745,094 A | 4/1998 | Gordon, II et al. |
| 5,760,761 A | 6/1998 | Sheridon |
| 5,777,782 A | 7/1998 | Sheridon |
| 5,790,298 A | 8/1998 | Tonar |
| 5,808,783 A | 9/1998 | Crowley |
| 5,852,484 A | 12/1998 | Inoue et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,307,605 B1 | 10/2001 | Bailey et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,352,748 B1 * | 3/2002 | Aylward et al. ............. 428/14 |
| 6,370,019 B1 | 4/2002 | Matthies et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,587,254 B2 * | 7/2003 | Matsunaga et al. ............ 359/296 |
| 6,639,578 B1 | 10/2003 | Comiskey et al. |
| 6,652,075 B2 | 11/2003 | Jacobson |
| 6,655,788 B1 * | 12/2003 | Freeman ............ 347/58 |
| 6,657,772 B2 | 12/2003 | Loxley |
| 6,664,944 B1 | 12/2003 | Albert et al. |
| 6,665,107 B2 | 12/2003 | Forgette et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,787,796 B2 | 9/2004 | Do et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |

(56) References Cited

U.S. PATENT DOCUMENTS

| | | | |
|---|---|---|---|
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,561,324 B2 | 7/2009 | Duthaler et al. |
| 7,602,118 B2 | 10/2009 | Cok et al. |
| 2002/0060321 A1 | 5/2002 | Kazlas et al. |
| 2002/0090980 A1 | 7/2002 | Wilcox et al. |
| 2003/0099027 A1 | 5/2003 | Shigehiro et al. |
| 2003/0102858 A1 | 6/2003 | Jacobson et al. |
| 2003/0179436 A1 | 9/2003 | Liang et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0007648 A1 | 1/2005 | Wu et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0179852 A1 | 8/2005 | Kawai |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0103427 A1 | 5/2007 | Zhou et al. |
| 2007/0109219 A1 | 5/2007 | Whitesides et al. |
| 2007/0152956 A1 | 7/2007 | Danner et al. |
| 2007/0153361 A1 | 7/2007 | Danner et al. |
| 2008/0074730 A1 | 3/2008 | Cao et al. |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

(56) References Cited

OTHER PUBLICATIONS

Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, A. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1" SVGA Microencapsulated Electrophoretic Active Matrix Display for Information Applicances, SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal $TiO_2$ Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).
Extended European Search Report for European Patent Application No. 12 006 356.5.

* cited by examiner

ELECTRO-OPTIC DISPLAY WITH EDGE SEAL

REFERENCE TO RELATED APPLICATIONS

This application is a divisional of application Ser. No. 12/607,197, filed Oct. 28, 2009 (Publication No. 2010/0039706, now U.S. Pat. No. 8,027,081, issued Sep. 27, 2011), which itself is a divisional of application Ser. No. 11/612,732, filed Dec. 19, 2006 (Publication No. 2007/0152956, now U.S. Pat. No. 7,649,674, issued Jan. 19, 2010), which is itself a continuation-in-part of copending application Ser. No. 10/907,065, filed Mar. 18, 2005 (Publication No. 2005/0146774, now U.S. Pat. No. 7,236,292, issued Jun. 26, 2007), which is itself a divisional of application Ser. No. 10/249,957, filed May 22, 2003 (now U.S. Pat. No. 6,982,178, issued Jan. 3, 2006), which itself claims benefit of Application Ser. No. 60/319,300, filed Jun. 18, 2002, and of Application Ser. No. 60/320,186, filed May 12, 2003.

This application is also related to:

(a) copending application Ser. No. 10/605,024, filed Sep. 2, 2003 (Publication No. 2004/0155857, now U.S. Pat. No. 7,561,324), which claims benefit of Application Ser. No. 60/319,516, filed Sep. 3, 2002;

(b) application Ser. No. 10/904,063, filed Oct. 21, 2004 (now U.S. Pat. No. 7,110,164), which is a continuation-in-part of the aforementioned application Ser. No. 10/605,024, and claims benefit of Applications Ser. Nos. 60/481,553, 60/481,554 and 60/481,557, all filed Oct. 24, 2003, Application Ser. No. 60/481,564, filed Oct. 27, 2003, and Application Ser. No. 60/520,226, filed Nov. 14, 2003;

(c) application Ser. No. 10/905,582, filed Jan. 12, 2005 (now U.S. Pat. No. 7,075,703), which claims benefit of Application Ser. No. 60/481,903, filed Jan. 14, 2004; and (d) copending application Ser. No. 11/550,114, filed Oct. 17, 2006 (Publication No, 2007/0109219, now U.S. Pat. No. 7,839,564), which is a continuation-in-part of the aforementioned application Ser. No. 10/605,024, and which claims benefit of Application Ser. No. 60/596,743, filed Oct. 18, 2005, and of Application Ser. No. 60/596,799, filed Oct. 21, 2005.

The entire contents of these applications, and of all other U.S. patents and published and copending applications mentioned below, are herein incorporated by reference.

BACKGROUND OF INVENTION

The present invention relates to an electro-optic display having an edge seal. This invention also provides processes for the production of such electro-optic displays. This invention is particularly, but not exclusively, intended for use with displays comprising encapsulated electrophoretic media. However, the invention can also make use of various other types of electro-optic media which are "solid", in the sense that they have solid external surfaces, although the media may, and often do, have internal cavities which contain a fluid (either liquid or gas). Such "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Patent Publication No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; and 7,119,772; and U.S. Patent Applications Publication Nos. 2002/0060321; 2002/0090980; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0122565; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. Application No. 2002/0075556, both assigned to Sipix Imaging, Inc.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

Other types of electro-optic materials may also be used in the present invention. Of particular interest, bistable ferroelectric liquid crystal displays (FLC's) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned copending application Ser. No. 11/550,114 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned copending application Ser. No. 11/550,114 also describes various methods designed for high volume manufacture of electro-optic displays using inverted front plane laminates; preferred forms of these methods are "multi-up" methods designed to allow lamination of components for a plurality of electro-optic displays at one time.

The aforementioned U.S. Pat. No. 6,982,178 also describes the importance of protecting the electro-optic medium from environmental contaminants, since some electro-optic media are sensitive to humidity and ultra-violet radiation, and most such media are susceptible to mechanical damage. This published application illustrates, in FIG. 10, a process in which a protective film is laminated over a front plane laminate in the same lamination operation by which the front plane laminate is laminated to a backplane; such a protective film can protect the electro-optic medium against ingress of moisture, other liquids, and some gases. However, even with such a protective film, the edge of the electro-optic medium is still exposed to the environment, and this published application teaches that it is also advisable for the display to include an edge seal, which serves to prevent the ingress of moisture and other contaminants around the outer edges of the display. Various types of edge seal are illustrated in FIGS. 11-17 of this published application. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Threebond 30Y-491 material (from Threebond Corporation, Cincinnati, Ohio) is especially preferred because of its favorable water vapor barrier properties, low viscosity at elevated temperature for easy dispensing of the edge seal material, good wetting characteristics, and manageable curing properties. Those skilled in the art and familiar with advanced sealants will be able to identify other sealants that offer comparable performance.

FIG. 20 of the aforementioned U.S. Pat. No. 6,982,178 shows a preferred form of electro-optic display having front protective layers and an edge seal. This preferred display comprises a thin film transistor (TFT) backplane generally similar to backplanes used with liquid crystal displays and having a matrix of pixel electrodes and associated thin film transistors and conductors for independently controlling the voltage applied to the pixel electrodes. A tape connect package is connected to a peripheral portion of the backplane and is provided with a driver integrated circuit (which controls the operation of the display); the tape connect package is also connected to a printed circuit board which contains additional circuitry for controlling the operation of the display.

On the upper surface (as illustrated in the aforementioned FIG. 20) of the backplane are disposed a layer of lamination adhesive, a layer of an electro-optic medium, a front electrode and a front substrate; the front electrode and front substrate are both conveniently formed from an indium-tin-oxide coated polymeric film, and as already noted such coated films are readily available commercially. The lamination adhesive layer, the electro-optic layer, the front electrode and front substrate are all derived from a front plane laminate which has been laminated to the backplane. One portion of the front electrode and front substrate extend beyond the electro-optic layer, and in the extended portion of the front electrode and front substrate, a conductive via formed from silver ink electrically connects the front electrode to circuitry provided on the backplane, while an adhesive layer secures the extended portion of the front electrode to the backplane.

Over the front substrate are disposed in succession a first layer of optically clear adhesive, a barrier film, a second layer of optically clear adhesive and a further, relatively thick protective film provided on its exposed surface with an anti-glare coating. The protective film acts to block ultra-violet radiation from reaching the electro-optic layer, and also prevents atmospheric moisture or other contaminants reaching this layer.

In order to form a complete seal around the electro-optic layer, the barrier film, the second layer of optically clear adhesive and the protective film are all made larger in both dimensions than the front substrate, so that these layers have peripheral portions which extend or "overhang" the outer edges of the front substrate. To complete the sealing of the electro-optic layer, a curable edge sealing material is injected, typically via a needle dispenser, into the area of the overhang, and cured to form an edge seal completely surrounding the electro-optic layer.

This type of edge seal is effective in preventing ingress of moisture and other environmental contaminants into the electro-optic medium. However, one of the advantages of encapsulated electrophoretic and other electro-optic media, for example rotating bichromal member and microcell media, is that they are sufficiently flexible to be used in flexible displays. The aforementioned type of edge seal, and similar edge seals, are not suitable for use in flexible displays since the edge seal itself imparts rigidity to the display.

Accordingly, there is thus a need for edge seals which can be used in flexible electro-optic displays, and the present invention seeks to provide such edge seals.

SUMMARY OF THE INVENTION

The present invention provides an electro-optic display comprising:
- a backplane comprising at least one electrode;
- a layer of electro-optic material disposed adjacent the backplane, the layer of electro-optic material being smaller in both dimensions than the backplane so as to leave a peripheral portion of the backplane extending beyond the edges of the layer of electro-optic material;
- a light-transmissive electrode disposed on the opposed side of the electro-optic material from the backplane;
- an electrode support disposed on the opposed side of the light-transmissive electrode from the layer of electro-optic material;
- a protective layer disposed on the opposed side of the electrode support from the layer of electro-optic material, the protective layer having an exposed viewing surface through which an observer can view the display; and
- a sealing material for preventing ingress of material from the environment into the electro-optic material, the sealing material extending from the peripheral portion of the backplane to the exposed viewing surface of the protective layer and overlapping a peripheral portion of the exposed viewing surface.

This display of the present invention may hereinafter for convenience be called the "overlapped sealing material" or "OSM" display of the invention.

Such an OSM display (and various other displays of the invention described below) may further comprise a layer of optically clear adhesive between the electrode support and the protective layer. Alternatively or in addition, an OSM display may further comprise an adhesive layer between the backplane and the layer of electro-optic material.

An OSM display (and the other displays of the invention described below) may make use of any of the types of solid electro-optic materials previously described. Thus, for example the present displays may use a rotating bichromal member or electrochromic material. Alternatively, the displays may use an electrophoretic material comprising a plurality of electrically charged particles disposed in a fluid and capable of moving through the fluid under the influence of an electric field. The electrically charged particles and the fluid may be confined within a plurality of capsules or microcells, or may be present as a plurality of discrete droplets surrounded by a continuous phase comprising a polymeric material. The fluid may be liquid or gaseous.

This invention also provides an electro-optic display comprising:
- a backplane comprising at least one electrode;
- a layer of electro-optic material disposed adjacent the backplane;
- a front substrate disposed on the opposed side of the layer of electro-optic material from the backplane;
- a first protective sheet disposed adjacent the front substrate on the opposed side thereof from the layer of electro-optic material; and
- a second protective sheet disposed adjacent the backplane on the opposed side thereof from the layer of electro-optic material,
- the first and second protective sheets being larger in both dimensions than the front substrate and backplane respectively so as the leave peripheral portions of the first and second protective sheets expending beyond the edges of the front substrate and backplane respectively, the peripheral portions of the first and second protective sheets being secured to each other, thereby sealing the electro-optic display.

This display of the present invention may hereinafter for convenience be called the "double sealed protective sheets" or "DSPS" display of the invention. In such a DSPS display, the first and second protective sheets may be secured to each other in any convenient manner, for example by welding or by means of an adhesive. A DSPS display may further comprise a layer of optically clear adhesive between the front substrate and the first protective layer. Such a display may further comprises an adhesive layer between the backplane and the layer of electro-optic material and/or between the layer of electro-optic material and the front substrate.

In another aspect, this invention provides an electro-optic display comprising:
- a backplane comprising at least one electrode;
- a layer of electro-optic material disposed adjacent the backplane, the layer of electro-optic material being smaller in both dimensions than the backplane so as to leave a peripheral portion of the backplane extending beyond the edges of the layer of electro-optic material; and
- a protective layer disposed on the opposed side of the layer of electro-optic material from the backplane, a peripheral portion of the protective layer extending beyond the edges of the layer of electro-optic material and being welded or heat sealed to the peripheral portion of the backplane.

This display of the present invention may hereinafter for convenience be called the "single sealed protective sheet" or "SSPS" display of the invention. In such an SSPS display, the backplane may comprise one or more barrier layers. The backplane may also be flexible, for example in the form of a polymeric film.

In another aspect, this invention provides an electro-optic display comprising:
- a backplane comprising at least one electrode;
- a layer of electro-optic material disposed adjacent the backplane, the layer of electro-optic material being smaller in both dimensions than the backplane so as to leave a peripheral portion of the backplane extending beyond the edges of the layer of electro-optic material;
- a protective layer disposed on the opposed side of the layer of electro-optic material from the backplane, a peripheral portion of the protective layer extending beyond the edges of the layer of electro-optic material and lying adjacent the peripheral portion of the backplane; and
- a sealing material for preventing ingress of material from the environment into the electro-optic material, the sealing material extending from the peripheral portion of the backplane to the adjacent surface of the protective layer.

This display of the present invention may hereinafter for convenience be called the "single protective sheet with sealer" or "SPSS" display of the invention.

In a preferred embodiment of this display of the present invention, a second protective layer is provided on the opposed side of the (first) protective layer and the sealing material extends from the peripheral portion of the backplane to the second protective layer.

In another aspect, this invention provides an electro-optic display comprising, in this order:
- a backplane comprising at least one electrode;
- a first layer of lamination adhesive;
- a layer of electro-optic material;
- a second layer of lamination adhesive; and
- a front substrate,
- wherein peripheral portions of the first and second layers of lamination adhesive extend outwardly beyond the edges of the layer of electro-optic material, the peripheral portions of the first and second layers of lamination adhesive contacting each other and thereby forming a seal around the layer of electro-optic material.

This display of the present invention may hereinafter for convenience be called the "double adhesive seal" or "DAS" display of the invention.

In one form of this electro-optic display, a protective layer may be provided on the opposed side of the front substrate from the second layer of lamination adhesive, the backplane may be larger in both dimensions than the first layer of lamination adhesive so that a peripheral portion of the backplane extends outwardly beyond the edges of the first layer of lamination adhesive, and a sealing material may be provided extending from the peripheral portion of the backplane to the protective layer, thereby forming an additional seal around the layer of electro-optic material. An optically clear adhesive may be provided between the front substrate and the protective layer.

In another aspect, this invention provides an electro-optic display comprising, in this order:
- a backplane comprising at least one electrode;
- a layer of electro-optic material, the layer of electro-optic material being smaller in both dimensions than the backplane so as to leave a peripheral portion of the backplane extending beyond the edges of the layer of electro-optic material;
- a layer of lamination adhesive; and
- a front substrate,
- wherein a peripheral portion of the layer of lamination adhesive extends outwardly beyond the edges of the layer of electro-optic material and contacts the peripheral portion of the backplane, thereby forming a seal around the layer of electro-optic material.

This display of the present invention may hereinafter for convenience be called the "single adhesive seal" or "SAS" display of the invention.

As with the displays of the present invention described above, an SAS display may further comprise a protective layer provided on the opposed side of the front substrate from the layer of lamination adhesive, with the backplane being larger in both dimensions than the layer of electro-optic material so that a peripheral portion of the backplane extends outwardly beyond the edges of the layer of electro-optic material, and a sealing material may be provided extending from the peripheral portion of the backplane to the protective layer.

In another aspect, this invention provides an electro-optic display comprising, in this order:
- a backplane comprising at least one electrode;
- a layer of electro-optic material;
- a layer of lamination adhesive; and
- a front substrate,
- the backplane and the front substrate being larger in both dimensions that the layer of electro-optic material and the layer of lamination adhesive, so that peripheral portions of the backplane and the front substrate extend outwardly beyond the edges of the layer of electro-optic material and the layer of lamination adhesive,
- the display further comprising a sealing material for preventing ingress of material from the environment into the electro-optic material, the sealing material extending from the peripheral portion of the backplane to the peripheral portion of the front substrate.

This display of the present invention may hereinafter for convenience be called the "extended front substrate" or "EFS" display of the invention.

In this electro-optic display, a second layer of lamination adhesive may be provided between the backplane and the layer of electro-optic material. Alternatively or in addition, the electro-optic display may further comprise a protective sheet disposed on the opposed side of the front substrate from the layer of electro-optic material, the protective layer extending outwardly beyond the edges of the front substrate, and the sealing material may extend to contact the protective sheet.

This invention also provides various types of electro-optic display in which sealing of the display is effected using a flexible tape extending around, and adhering to, the periphery of the display. Accordingly, this invention provides an electro-optic display comprising:
- a backplane comprising at least one electrode;
- a layer of electro-optic material disposed adjacent the backplane;
- a front substrate disposed on the opposed side of the layer of electro-optic material from the backplane; and
- a flexible tape extending around the periphery of the display, the tape comprising a sealing layer for preventing ingress of material from the environment into the electro-optic material, and an adhesive layer adhesively secured to the peripheries of the backplane and front substrate, thereby sealing the layer of electro-optic material.

This display of the present invention may hereinafter for convenience be called the "tape sealed" or "TS" display of the invention.

There are several forms of this "tape sealed" display. In one such form, the tape is confined to peripheral portions of the backplane and the front substrate, a major part of the backplane and of the front substrate not being covered by the tape, i.e., the tape simply extends around the periphery of the display, preferably with parts of the adhesive layer of the tape secured to peripheral areas of the exposed major surfaces of the backplane and front substrate (i.e., the peripheral areas of the viewing surface of the display and the rear surface of the backplane). In another form of the tape sealed display, the tape extends continuously over the whole surface of the backplane remote from the layer of electro-optic material. In this type of TS display, typically the tape extends around the periphery of the display and is secured to a peripheral area of the front substrate, but the tape extends continuously over the whole rear surface of the backplane. This form of tape sealed display may be useful where the backplane itself does not provide sufficient sealing of the electro-optic material, as may be the case with some flexible backplanes. In another form of tape sealed display, the backplane is larger than the front substrate in both dimensions so that a peripheral portion of the backplane extends outwardly beyond the edges of the front substrate, and the adhesive layer of the tape is secured to the peripheral portion of the backplane and to the exposed major surface of the front substrate (i.e., to the viewing surface of the display). An essentially similar form of display can be provided without using a preformed tape by providing the same enlarged backplane, applying a flexible sealant to the edge of the display so that the sealant extends from the peripheral area of the backplane to the front substrate and overlaps a peripheral portion of the exposed major surface of the front substrate, and applying a flexible barrier layer over the flexible sealant.

Another form of sealed electro-optic display may conceptually be regarded as a tape sealed display, although it is typically not formed using a discrete tape. This type of display comprises in this order:
  a backplane comprising at least one electrode;
  a layer of electro-optic material disposed adjacent the backplane;
  a layer of lamination adhesive; and
  a front substrate,
  both the layer of lamination adhesive and the front substrate extending around the edges of the layer of electro-optic material, with the lamination adhesive being secured to the backplane and the front substrate overlying the portion of the lamination adhesive layer in contact with the backplane.

Thus, in this form of TS display, a lamination adhesive layer is present between the layer of electro-optic material and the front substrate, and both the front substrate and the adjacent lamination adhesive layer are extended around the edges of the layer of electro-optic material as far as the backplane, with the lamination adhesive layer being secured to the backplane and the front substrate overlying the portion of the lamination adhesive layer in contact with the backplane; the "extensions" of the front substrate and the adjacent lamination adhesive layer may be either true extensions or separate pieces formed on the same materials.

This invention also provides an electronic book reader, portable computer, tablet computer, cellular telephone, smart card, sign, watch, shelf label or flash drive comprising a display of the present invention.

Figure 1:
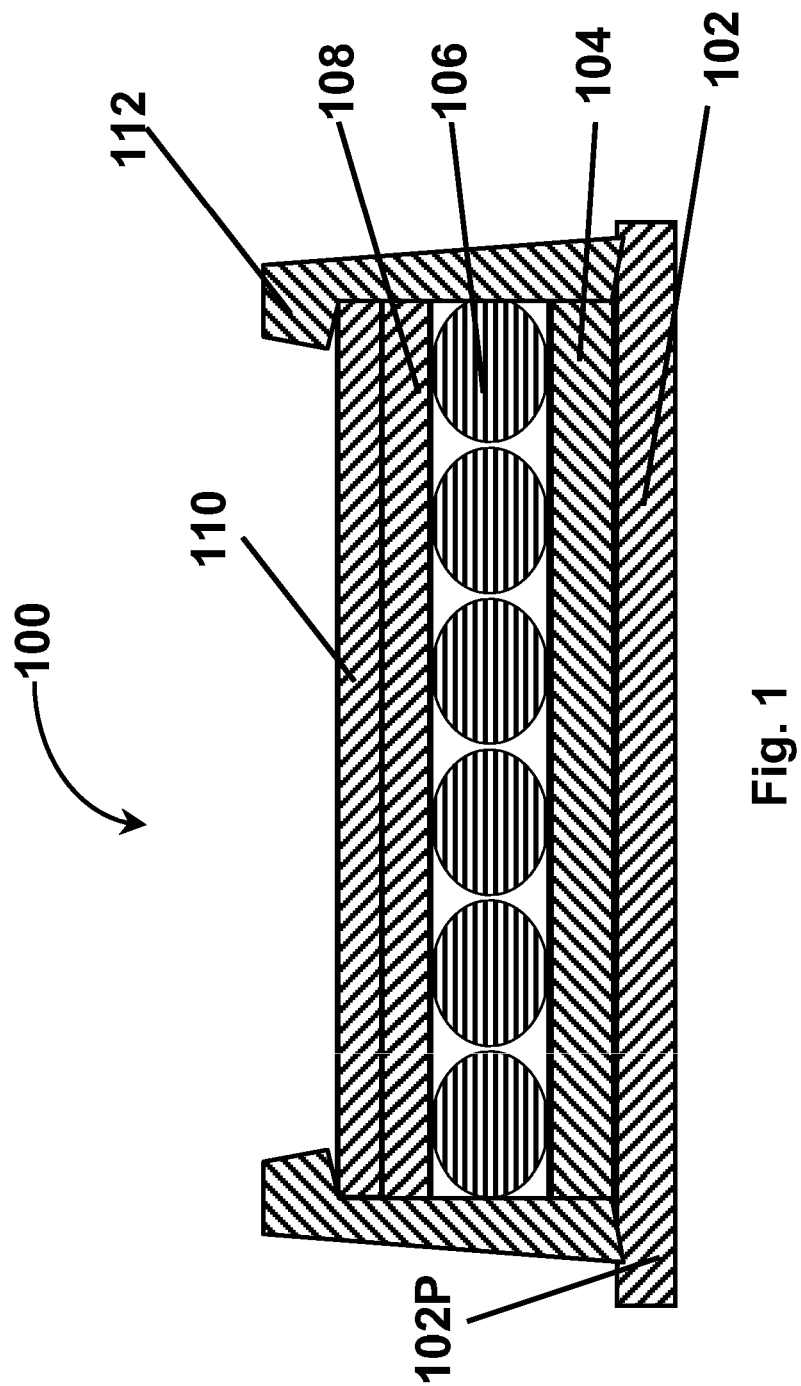
FIG. 1 of the accompanying drawings is a schematic section through a overlapped sealing material electro-optic display of the present invention.

It should be stressed that all the accompanying drawings are schematic and not to scale. In particular, for ease of illustration, the thicknesses of the various layers in the drawings do not correspond to their actual thicknesses. Also, in all the drawings, the thicknesses of the various layers are greatly exaggerated relative to their lateral dimensions.

DETAILED DESCRIPTION

Flexible, including rollable, electro-optic displays, especially those using encapsulated electrophoretic media, present important new marketing opportunities; for example, large displays which can be stored in a compact form may be useful as additional display devices on electronic devices which are presently equipped only with a small display screen but where a larger display screen would often be useful; examples of such devices include cellular telephones equipped to receive electronic mail. However, such flexible electro-optic displays will typically require sealing to prevent the ingress of water vapor and other environmental contaminants which can adversely affect the electro-optic properties or operating lifetime of the display. The aforementioned U.S.

Pat. Nos. 6,982,178 and 7,110,164 and Patent Publication No. 2004/0155857 all discuss the sealing of electro-optic displays, but most of the displays there considered are rigid, being formed on glass or similar backplanes, and additional difficulties occur in choosing suitable sealing techniques for flexible displays. Both the structural characteristics and the barrier properties of the sealing materials used need to be carefully considered, as well as the construction of the final display, to provide adequate sealing in flexible displays.

As discussed in detail below, there are several approaches to sealing flexible displays using combinations of substrate, edge seal material and assembly techniques. For the purpose of subsequent discussion, the term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane). If one or more additional barrier layers need to be added to the backplane to reduce ingress of moisture and other contaminants, the barrier layers should be located as closely as possible to the electro-optic layer so that little or no edge profile of low barrier material is present between the front (discussed below) and rear barrier layers.

The term "front substrate" is used herein consistent with its conventional meaning in the art of electro-optic displays and in the aforementioned patents and published applications, to mean a rigid or flexible material that is light-transmissive (and preferably transparent). The front substrate will typically comprise at least one electrode, most commonly a single continuous front electrode extending across the entire display, although as already mentioned certain displays which are written with a stylus of similar writing implement separate from the display itself do not require a front electrode. Typically, the exposed surface of the front substrate will form the viewing surface through which an observer views the display, although, as in some of the preferred embodiments described below, there may be additional layers interposed between the front substrate and the viewing surface. As with the backplane, the front substrate needs to provide sufficient barrier properties to prevent ingress of moisture and other contaminants through the viewing side of the display. If one or more additional layers need to be added to the front substrate to reduce ingress of moisture and other contaminants, the barrier layers should be located as closely as possible to the electro-optic layer so that little or no edge profile of low barrier material is present between the front and rear barrier layers.

As discussed in the aforementioned U.S. Pat. Nos. 6,982,178 and 7,110,164 and Patent Publication No. 2004/0155857, one preferred form of front substrate for electro-optic displays comprises a thin layer of ITO on PET, such coated films being readily available commercially. In such a front substrate, the ITO layer serves as a barrier material, but in practice inevitably suffers from pinholes and cracks, through which moisture and other contaminants can penetrate to the electro-optic material. To increase the sealing properties of such a PET/ITO or similar front substrate, it is desirable to laminate a redundant barrier layer on to the front substrate, this redundant barrier layer being formed of a homopolymer (for example, polychlorotrifluoroethylene, available from Honeywell Corporation under the Registered Trade Mark "ACLAR"), or a sputtered ceramic (for example $AlO_x$, available from Toppan Printing Company under the trade name Toppan GX Film). The redundant barrier layer should be thin to provide a flexible display, ideally about 12 μm, but could be as thick as 5 mil (127 μm) if sufficient flexibility is still available. Where an adhesive layer is required to attach the redundant barrier to the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives.

Alternatively, the barrier properties of a PET/ITO or similar front substrate may be improved by coating a redundant metal oxide layer (for example, an alumina layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., 3047 Orchard Parkway, San Jose, Calif. 95134 could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 μm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (sold under the Registered Trade Mark "SARAN"), polychlorotrifluoroethylene (sold under the Registered Trade Marks "ACLAR" and "CLARIS"), triacetyl cellulose, the material sold under the Registered Trade Mark "ARTON" by JSR Company, polyethersulfone (PES) and laminates of two or more of these materials. Suitable transparent conductive materials include ITO, organic conductive polymers such as Baytron P®, carbon nanotubes, and other suitably conducting light transmissive conductors (transmission greater than 60 per cent) having resistivities of less an about $10^4$ ohms/square.

Preferred displays of the present invention will now be described, though by way of illustration only, with reference to the accompanying drawings. In all cases, the electro-optic layer may be an encapsulated electrophoretic layer, a polymer-dispersed electrophoretic layer, or any of the other types of electro-optic layer discussed above. The display may contain one or two lamination adhesive layers to attach the electro-optic material to the front substrate and/or the backplane. The display may be viewed through either lamination adhesive layer, and the display may be assembled by direct coating and lamination, or by the use of front plane laminates, inverted front plane laminates, or double release films, as described in the patents and applications mentioned in the "Reference to Related Applications" Section hereof. Although as mentioned above, the display is normally viewed through the front substrate, in some cases a light-transmissive backplane can be used to provide a double-sided display, or one operating in the aforementioned shutter mode. In all the accompanying drawings, the electro-optic displays are illustrated with the viewing surface (alternatively called the front surface) of the display at the top, so that references hereinafter to front and rear surfaces refer to upper and lower surfaces respectively as illustrated in the relevant drawings.

FIG. 1 of the accompanying drawings is a schematic section through an overlapped sealing material display (generally designated 100) of the present invention. The display 100 comprises a flexible backplane 102, on which are disposed, in order, a lamination adhesive layer 104, a layer 106 of electro-optic material (illustrated as an encapsulated electrophoretic material comprising a plurality of capsules in a polymeric binder, but other types of electro-optic material could of course be used), a front substrate 108 comprising a PET film bearing, on its surface adjacent the electro-optic material layer 106, a thin layer of ITO (this ITO layer is not illustrated separately in FIG. 1), and a protective or barrier layer 110 secured to the front substrate by a layer of optically clear adhesive (not shown). It should be noted that the layers 104-110 are all of the same size, which is smaller than the size of the backplane 102 (actually the layers 104-110 are smaller in both dimensions than the backplane 102, although this may not be apparent from FIG. 1). Accordingly, a peripheral portion (designated 102P) of the backplane 102 extends outwardly beyond the edges of the layers 104-110 all around the periphery of these layers.

An edge seal 112 is formed by dispensing a bead of a sealing material around the edge of the display 100, the edge seal 112 extending from the peripheral portion 102P of the backplane to the barrier layer 110, and overlapping a peripheral portion of the front surface of the barrier layer 110. It has been found that overlapping the edge seal over the front surface of the display in this manner is important in securing an edge seal having high mechanical durability. The material used to form the edge seal 112 may be any material that has sufficient flexibility, adhesion and barrier properties; obviously, it may be necessary to cure the sealing material after it has been applied.

The display 100 shown in FIG. 1 is a modified form of the electro-optic displays shown in FIGS. 11, 12, 13 and 15 of the aforementioned U.S. Pat. No. 6,982,178, differing only in the form of the edge seal; it has been found that the form of edge seal shown in FIG. 1 gives better mechanical durability than the prior art edge seals. The display 100 may be constructed using the same methods as described in detail in the aforementioned U.S. Pat. No. 6,982,178.

Figure 2:
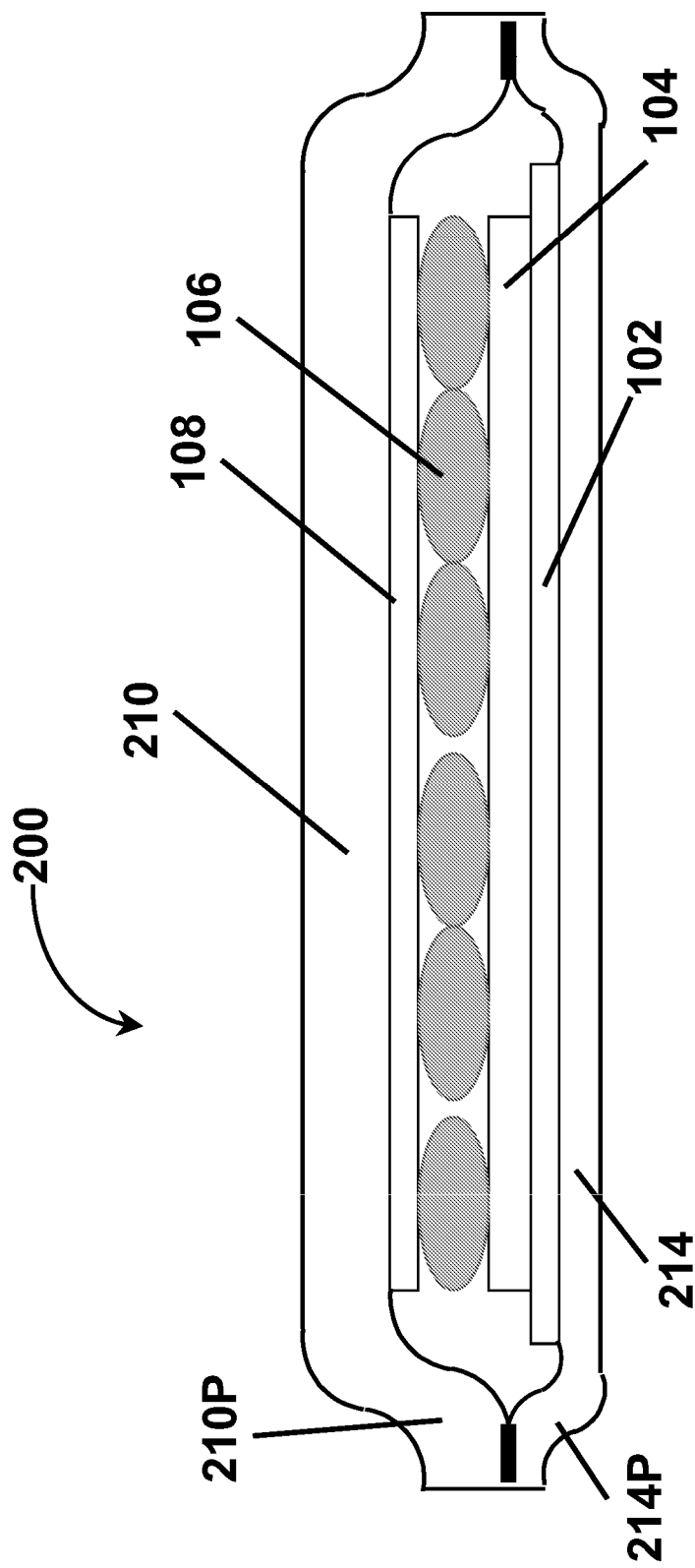
FIG. 2 is a schematic section through a double sealed protective sheet electro-optic display of the present invention.

FIG. 2 is a schematic section through a double sealed protective sheet display (generally designated 200) of the present invention. This display 200 comprises a backplane 102, a lamination adhesive layer 104, a layer 106 of electro-optic material, and a front substrate 108, all of which are substantially the same as the corresponding integers of the display 100 shown in FIG. 1. However, the display 200 lacks the edge seal 112 of the display 100. Instead, the display 200 is provided with a front protective or barrier sheet 210 which serves the same protective and barrier function as the barrier layer 110 of display 100. However, the barrier sheet 210 shown in FIG. 2 is substantially larger in both dimensions than the backplane 102 and the layers 104-108, so that a peripheral portion 210P of the barrier sheet 210 extends outwardly beyond the edges of the backplane 102 and the layers 104-108. The front barrier sheet 210 is adhesively secured to the front substrate 108 by an optically clear adhesive (not shown).

The display 200 further comprises a rear barrier sheet 214, which is of the same size and material as the front barrier sheet 210. The rear barrier sheet 214 is adhesively secured to the backplane 102 by an adhesive (not shown); this adhesive may be, but does not need to be, optically clear since the adhesive is normally not visible to an observer of the display. A peripheral portion 214P of the rear barrier sheet 214 extends outwardly beyond the edges of the backplane 102 and lies the adjacent the peripheral portion 210P of the front barrier sheet 210, the two peripheral portions 210P and 214P being welded to each other all around the display 200, thus completely sealing the display 200. Laser or ultrasonic welding may be used, or the two peripheral portions could be adhesively secured together. As compared with the display 100 shown in FIG. 1, the display 200 may offer manufacturing advantages, since the display 200 does not require accurate dispensing of a sealing material, but only welding or adhesion of two (typically polymeric) sheets, a process which can readily be effected in high volumes using apparatus and processes well known in the art.

Figure 3:
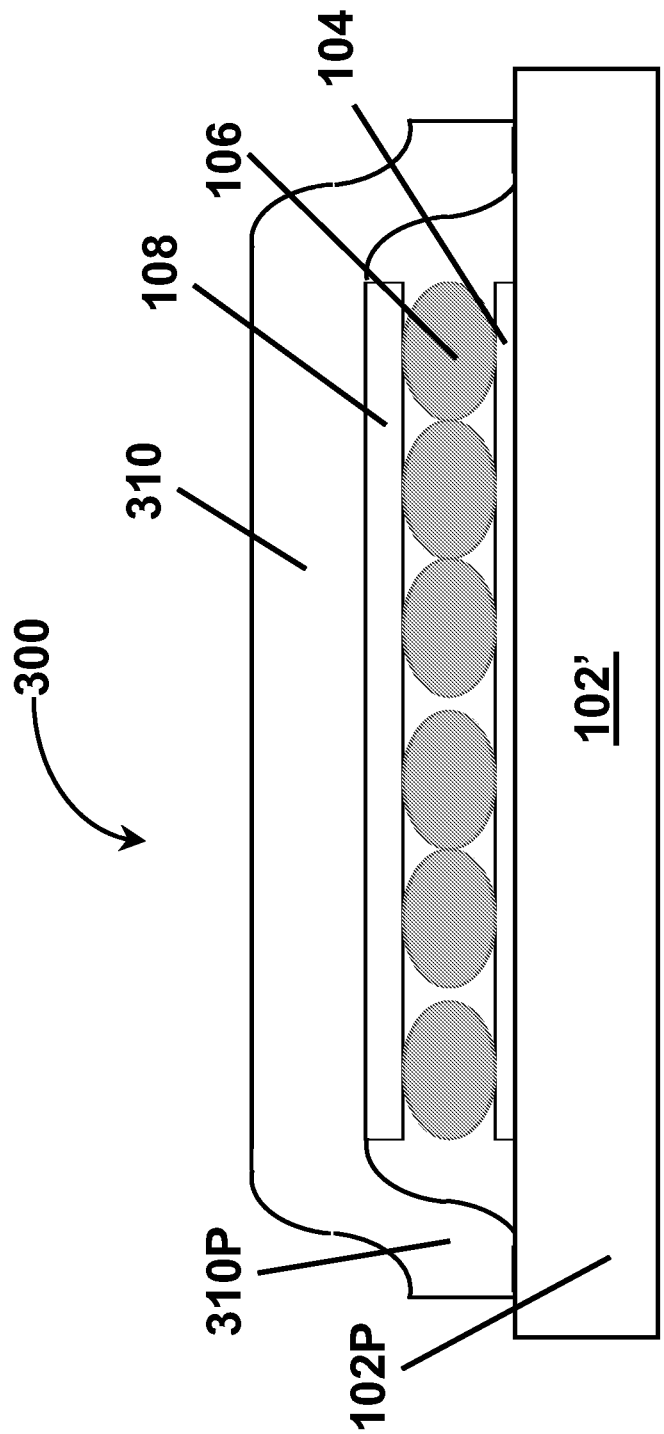
FIG. 3 is a schematic section through a single sealed protective sheet electro-optic display of the present invention.

FIG. 3 is a schematic section through a single sealed protective sheet display (generally designated 300) of the present invention. This display 300 comprises a backplane 102', a lamination adhesive layer 104, a layer 106 of electro-optic material, and a front substrate 108, all of which are substantially the same as the corresponding integers of the display 200 shown in FIG. 2, except that the backplane 102' is thicker than the backplane 102 of the display 200 and may, for reasons explained below, include additional barrier layers, for example metal oxide layers on one or both of its major surfaces. The backplane 102' is also somewhat larger relative to the layers 104-108 than the backplane 102 of display 200, leaving a substantial peripheral portion 102P extending well beyond the edges of the layers 104-108.

The display 300 further comprises a front protective or barrier sheet 310, which is similar to the barrier sheet 210 of display 200, and similarly has a peripheral portion 310P extending outwardly beyond the edges of the layers 104-108. The peripheral portion 310P of the front barrier sheet 310 is sealed to the peripheral portion 102P of the backplane 102' by melting an appropriate portion of the front barrier sheet using, for example, laser or ultrasonic welding. Alternatively, the peripheral portions 310P and 102P could be adhesively secured to each other.

It will be seen that the single sealed protective sheet display 300 shown in FIG. 3 is conceptually very similar to the double sealed protective sheet display 200 shown in FIG. 2, in that both types of displays sandwich the lamination adhesive layer, electro-optic layer and front substrate between two barrier layers, the difference between the two types of displays being that in the DSPS display the backplane and the rear barrier sheet are separate integers, whereas in the SSPS display the backplane serves both functions. Accordingly, the SSPS display places greater demands upon the barrier properties of the backplane than the DSPS display, and hence it may be desirable that an SSPS backplane include additional barrier layers, as already mentioned.

The DSPS and SSPS types of display are especially adapted for use with flexible displays, in which the backplane is formed of flexible materials, for example polymeric films; in such a display the backplane might comprise, for example, organic transistors printed on a polymeric film. Such a display does not require the type of thick, rigid sealing member found in some prior art displays, and, provided the backplane is sufficiently flexible, the peripheral portions of the backplane and barrier sheet, or the two barrier sheets, adhered to each other can remain flexible. However, we do not exclude the possibility that the present invention could be used in rigid or semi-rigid displays.

Figure 4:
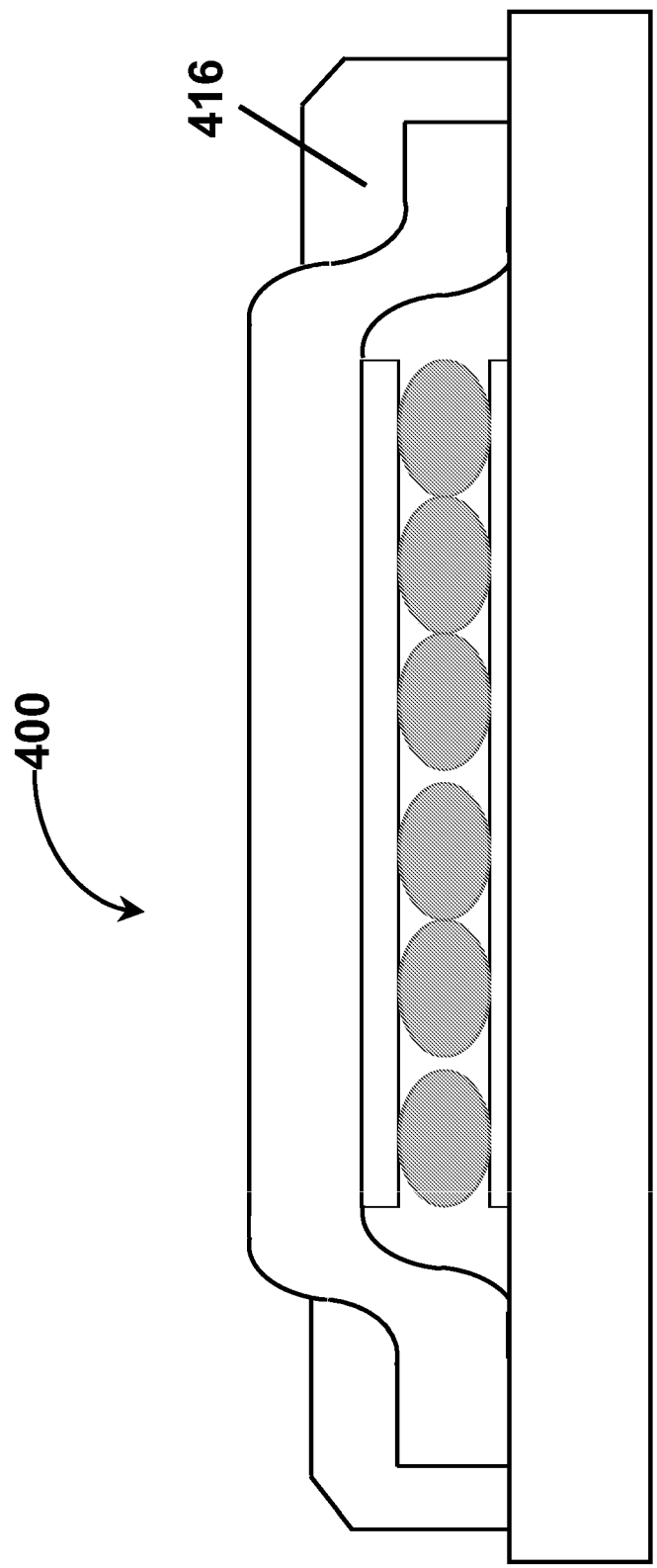
FIG. 4 is a schematic section through a single protective sheet with sealer modification of the electro-optic display shown in FIG. 3.

FIG. 4 is a schematic section through a "single protective sheet with sealer" (SPSS) display (generally designated 400) of the present invention which is a modified form of the display 300 shown in FIG. 3. The modification in display 400 consists of dispensing a bead 416 of sealing material extending from the peripheral portion of the backplane to the adjacent part of the front surface of the front barrier layer to provide additional barrier and mechanical protection to the display 400. It will be seen that the bead 416 covers the weld between the peripheral portions of the backplane and the front barrier sheet, and the overlap of the bead 416 over the front surface of the front barrier sheet forms a bond to the front barrier sheet for mechanical durability. The sealant material used to form the bead 416 may be any material that has sufficient flexibility, adhesion and barrier properties; it may of course be necessary to cure the sealant material after it is dispensed to form the bead 416.

Figure 5:
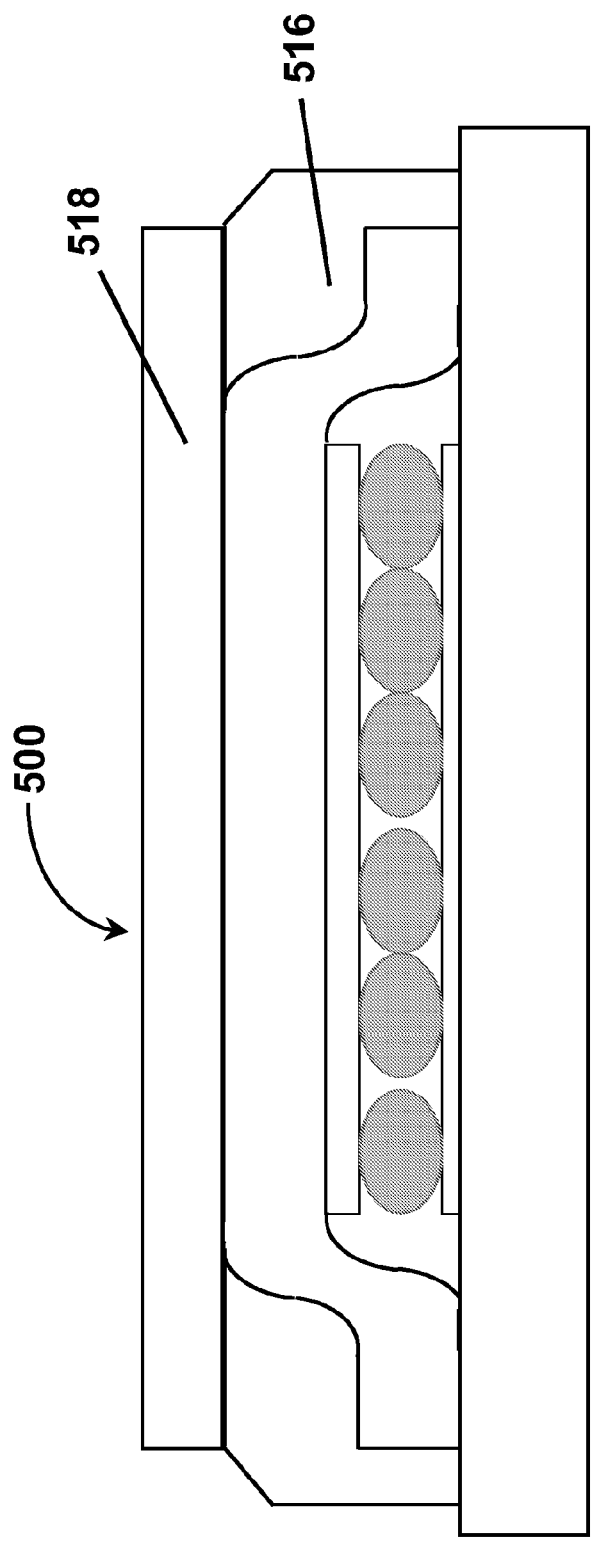
FIG. 5 is a schematic section through a further modification of the electro-optic display shown in FIG. 4 to incorporate an additional front protective sheet.

FIG. 5 shows a further modification of the display shown in FIG. 4. The SPSS display (generally designated 500) shown in FIG. 5 differs from the display 400 shown in FIG. 4 in that, in the display 500, the bead of sealant material is made thicker, so that it extends forwardly to the front surface of the front barrier layer, thus forming a modified bead designated 516, and an additional front protective sheet 518 having barrier problems is adhered to the front surface of the front protective sheet by means of an optically clear adhesive (not shown), the protective sheet 518 contacting the bead 516; thus, the bead 516 forms an "underfill" seal of the type described in the aforementioned U.S. Pat. No. 6,982,178. Again, the sealant material used to form the bead 516 may be any material that has sufficient flexibility, adhesion and barrier properties; it may of course be necessary to cure the sealant material after it is dispensed to form the bead 516.

In the displays shown in FIGS. 1 to 5, the sealing of the electro-optic layer has been effected by various combinations of backplane, edge sealing material, and front and rear protective or barrier sheets. However, it is also possible to use lamination adhesive layers to effect sealing of an electro-optic layer, and displays sealed in this manner will now be described.

Figure 6:
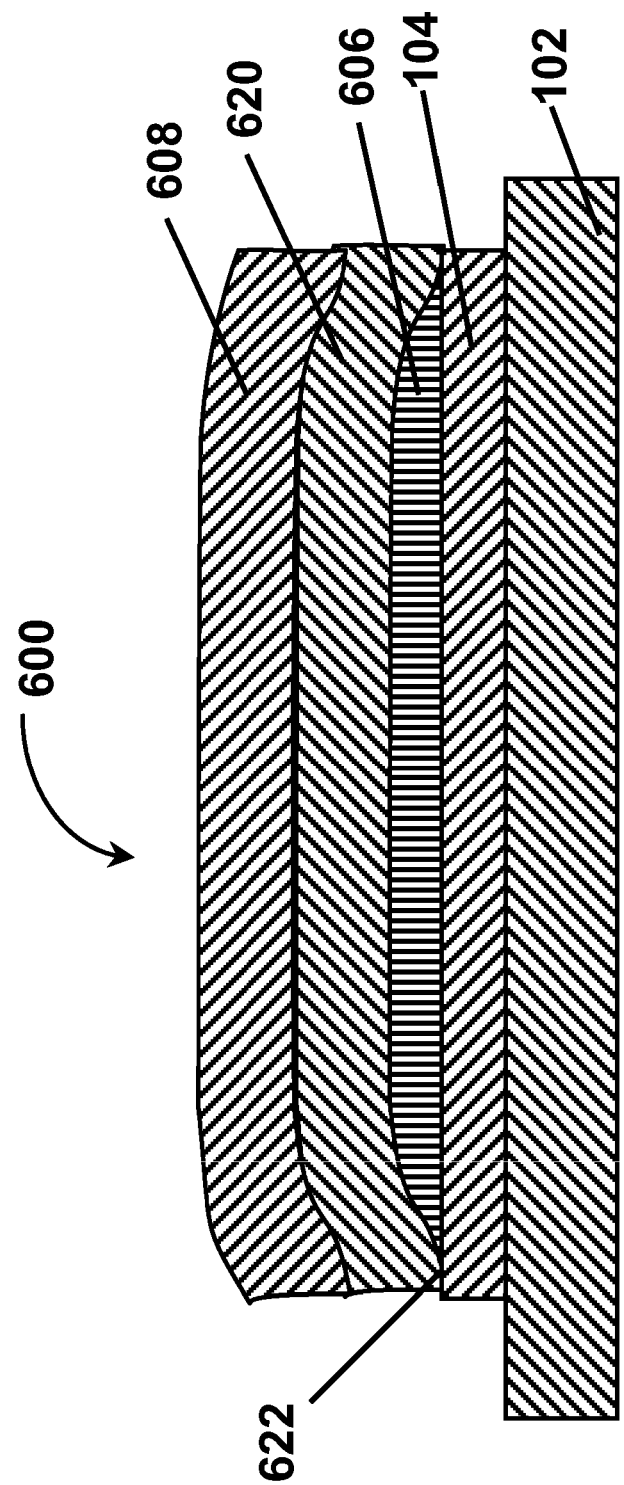
FIG. 6 is a schematic section through a double adhesive seal electro-optic display of the present invention.

FIG. 6 is a schematic section through a double adhesive seal electro-optic display of this type. The display (generally designated 600) shown in FIG. 6 comprises a backplane 102 and a first lamination adhesive layer 104, both of which are essentially identical to the corresponding integers in the displays shown in FIGS. 1 to 5. The display 600 further comprises a layer 606 of electro-optic material, a second lamination adhesive layer 620 and a front substrate 608. As shown in FIG. 6, the peripheral portions of the front substrate 608 and the second lamination adhesive layer 620 are deformed rearwardly relative to the central portions of these layers, so that the peripheral portion of the second lamination adhesive layer 620 contacts the first lamination adhesive layer 104, thus forming an edge seal, as indicated at 622.

The double adhesive seal display 600 shown in FIG. 6 may conveniently be formed using a double release film as described in the aforementioned 2004/0155857.

Figure 7:
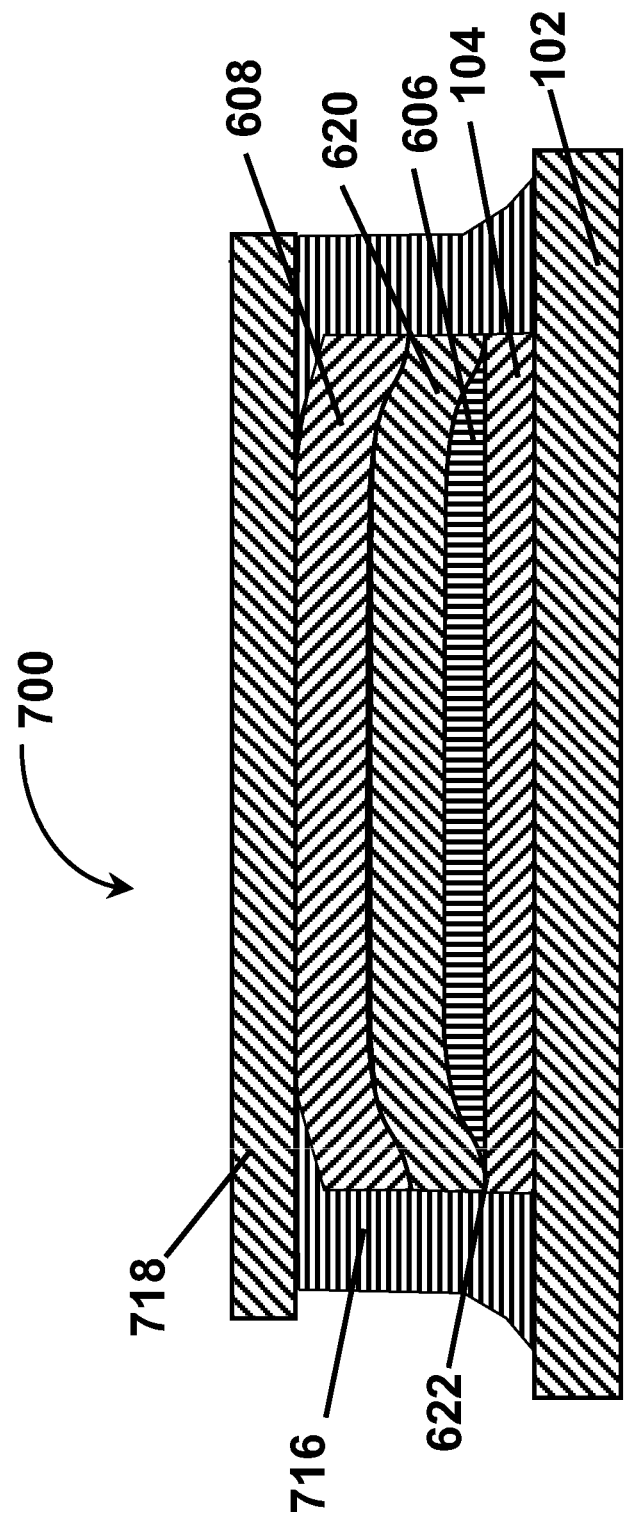
FIG. 7 is a schematic section through a modification of the electro-optic display shown in FIG. 6 to incorporate an additional front protective sheet.

FIG. 7 is a schematic section through a display (generally designated 700), which is a modification of the display 600 shown in FIG. 6. The modification comprises providing an additional front protective sheet 718 (similar to the sheet 518 shown in FIG. 5) and a bead 716 of sealing material (similar to the bead 516 shown in FIG. 5), this bead 516 of sealing material extending from the backplane 102 to the rear surface of the protective sheet 718 and thus forming the same type of underfill seal as in FIG. 5. The remarks above regarding the properties needed in protective sheets and sealing materials also, of course, apply to the protective sheet 718 and sealing material 716.

Figure 8:
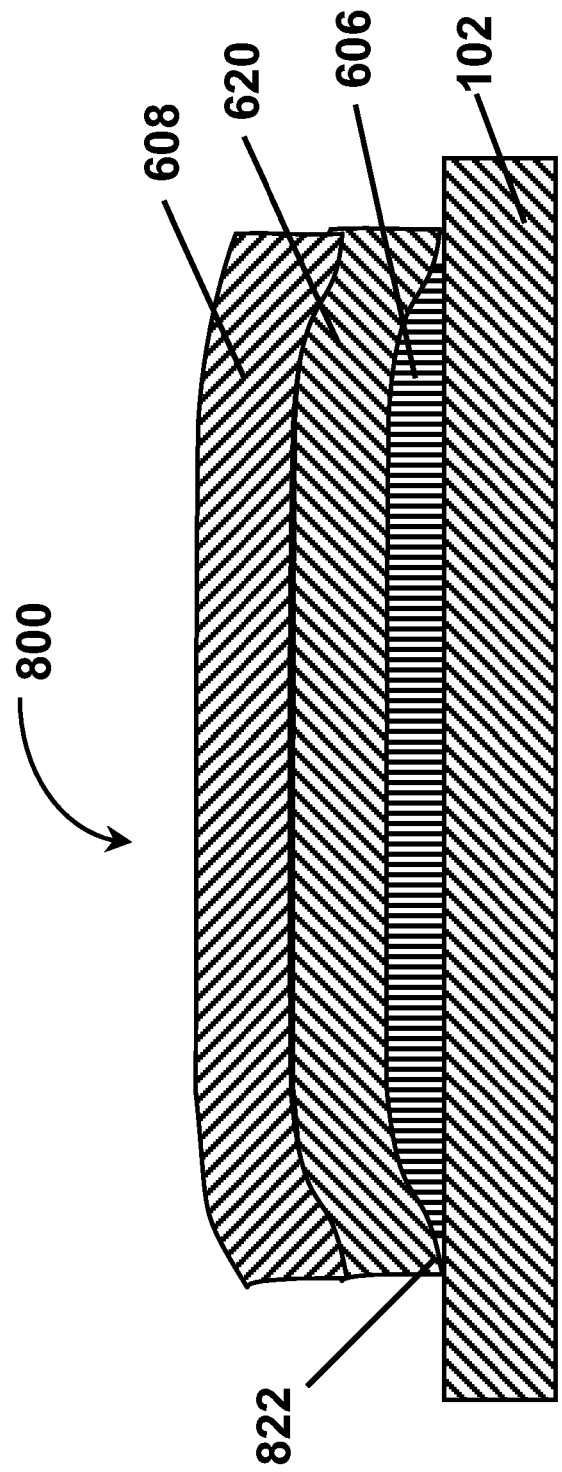
FIG. 8 is a schematic section through a single adhesive seal electro-optic display of the present invention.

FIG. 8 is a schematic section through a single adhesive seal electro-optic display (generally designated 800) of the present invention. The single adhesive seal (SAS) display 800 may notionally be regarded as produced by omitting the first lamination adhesive layer 104 from the display 600 shown in FIG. 6, and the numbering of the various layers in FIG. 8 follows this assumed derivation of the display 800. Because the first lamination adhesive layer 104 is omitted from the display 800 the edge seal (indicated at 822) which seals the electro-optic layer 606 is formed between the lamination adhesive layer 620 and the backplane 102.

The display 800 may conveniently be produced using an inverted front plane laminate as described in the aforementioned copending application Ser. No. 11/550,114.

Figure 9:
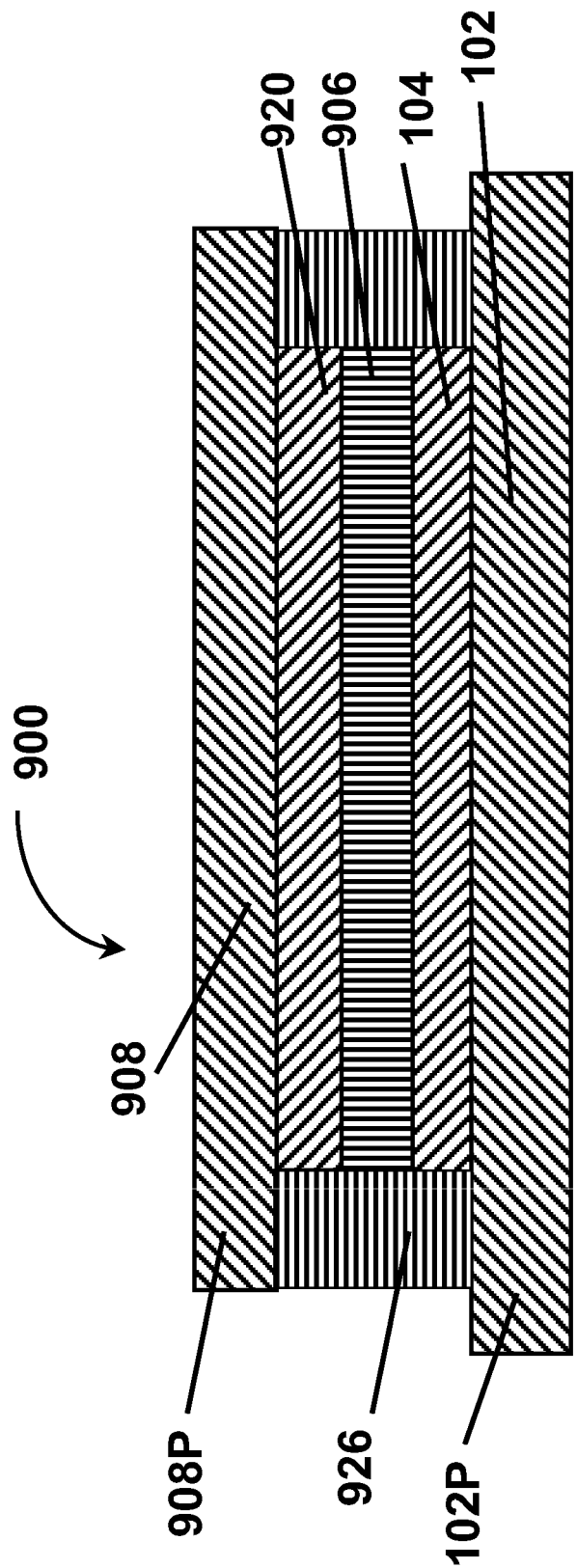
FIG. 9 is a schematic section through a first extended front substrate electro-optic display of the present invention having two lamination adhesive layers.

FIG. 9 is a schematic section through a first extended front substrate display (generally designated 900) of the present invention. The display 900 comprises a backplane 102, a first lamination adhesive layer 104, a layer 906 of electro-optic material, and a second lamination adhesive layer 920, all of which are essentially identical to the corresponding layers in the display 700 shown in FIG. 7, except that all the layers 104, 906 and 920 are of the same thickness throughout their areas, so that the front surface of the second lamination adhesive layer 920 lies parallel to the front surface of the backplane 102. The backplane 102 is larger in both dimensions than the layers 104, 906 and 920, so that a peripheral portion 102P of the backplane 102 extends outwardly beyond the edges of the layers 104, 906 and 920.

The display 900 further comprises a front substrate 908, which is larger in both dimensions than the layers 104, 906 and 920, so that a peripheral portion 908P of the front substrate 908 extends outwardly beyond the edges of the layers 104, 906 and 920. A sealing gasket 926, which may either be printed on to the backplane 102 or front substrate 908 before the two are laminated together, or may be dispensed at the required location as previously described, extends from the peripheral portion 102P of the backplane to the peripheral portion 908P of the front substrate, thus sealing the display.

Figure 10:
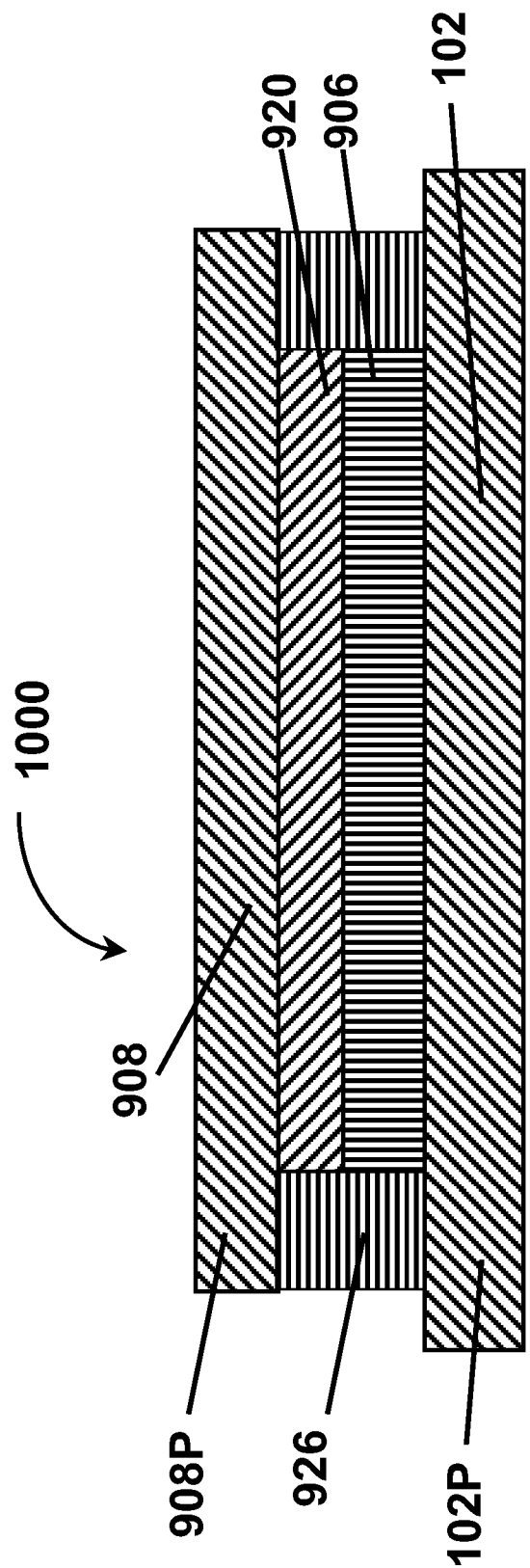
FIG. 10 is a schematic section through a second extended front substrate electro-optic display of the present invention having only one lamination adhesive layer.

FIG. 10 is a schematic section through a second extended front substrate electro-optic display (generally designated 1000) of the present invention. The display 1000 may notionally be regarded as a modified form of the display 900 shown in FIG. 9, the modification comprising the removal of the first lamination adhesive layer 104 from the display 900, so that in the display 1000 the electro-optic layer 906 is in direct contact with the backplane 102.

Figure 11:
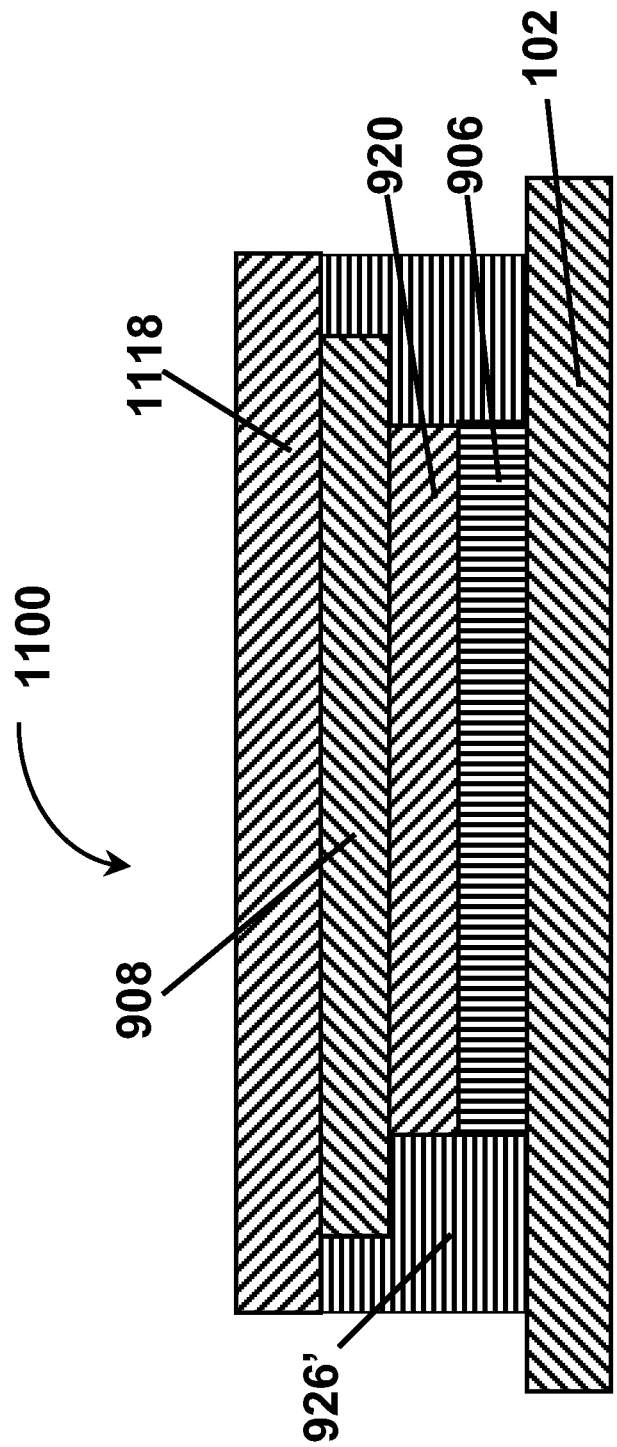
FIG. 11 is a schematic section through a modification of the electro-optic display shown in FIG. 10 to incorporate an additional front protective sheet.

FIG. 11 is a schematic section through a third extended front substrate display (generally designated 1100) of the present invention which is essentially a modified form of the display 1000 shown in FIG. 10, the modification being generally similar to that used to modify the display 600 shown in FIG. 6 to the display 700 shown in FIG. 7. The display 1100 may be regarded as notionally produced from the display 1000 by securing a front protective sheet 1118 with an optically clear adhesive (not shown) to the front surface of the front substrate 908, and extending the sealing gasket outwardly and forwardly around the edges of the front substrate 908 to form a modified gasket 926', which extends from the backplane 102 to the rear surface of the front protective sheet 1118, thus providing additional sealing of the display 1100. The gasket 926' may be a printed gasket, although in view of its form, it may be more convenient to produce it by dispensing sealing material around the periphery of display 1100 after the front protective layer 1118 is in place.

Figure 12:
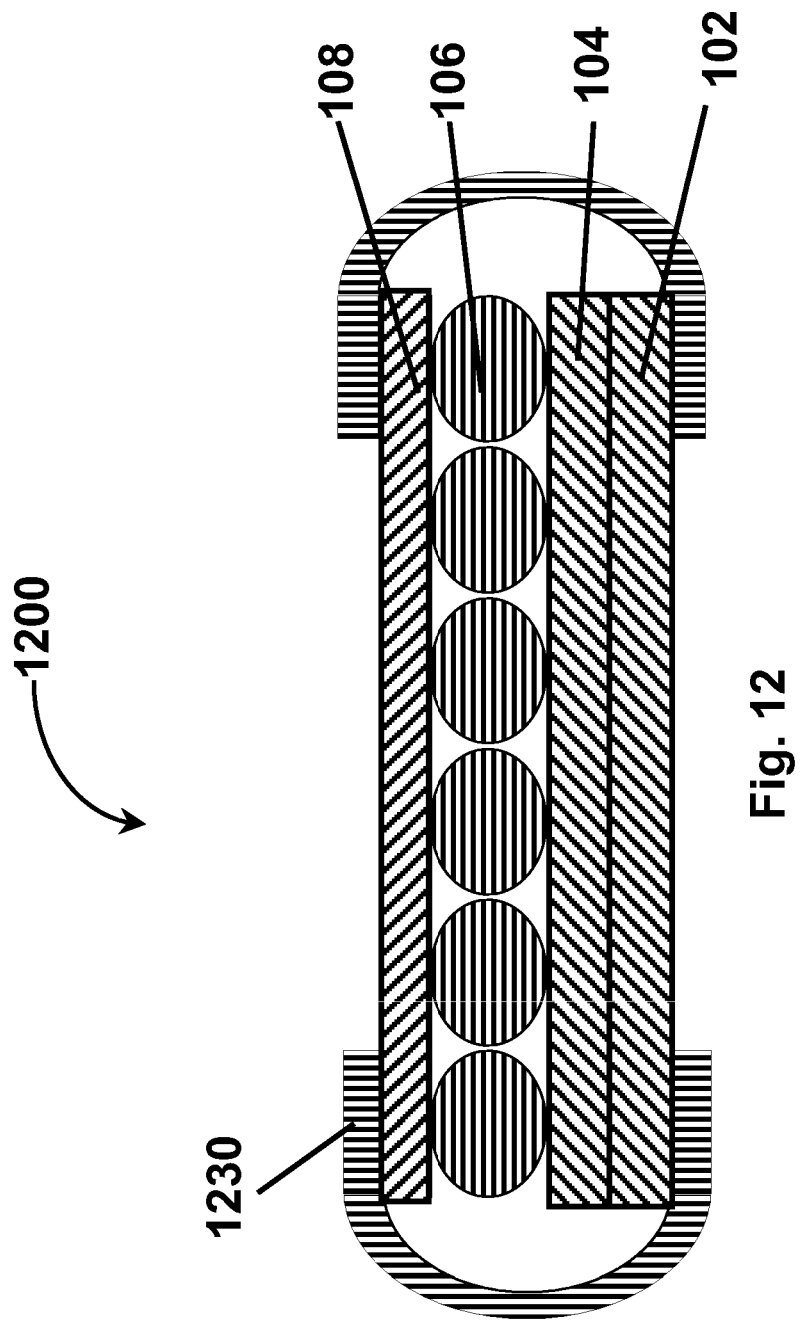
FIG. 12 is a schematic section through a simple tape sealed electro-optic display of the present invention.

As already mentioned, the displays of the present invention may also be sealed by means of a flexible tape, and FIG. 12 is a schematic section through a display (generally designated 1200) of this type. The display 1200 comprises a backplane 102, a lamination adhesive layer 104, a layer 106 of electro-optic material and a front substrate 108, all of which are essentially identical to the corresponding integers of the display 100 shown in FIG. 1. However, the display 1200 is sealed by means of a flexible tape 1230, which extends all around the periphery of the display 1200. Although not shown in FIG. 12, the tape 1230 in fact comprises two separate layers, an outer layer having good barrier characteristics (typically a polymer, for example polychlorotrifluoroethylene) and an inner adhesive layer, which is used to secure the tape to the backplane and front substrate of the display. It should be noted that the tape is adhesively secured to the rear surface of the backplane 102 and the front surface of the front substrate 108, thus forming a complete seal around the display, and eliminating the need for any outward extension of the front substrate similar to that shown in FIG. 11.

Figure 13:
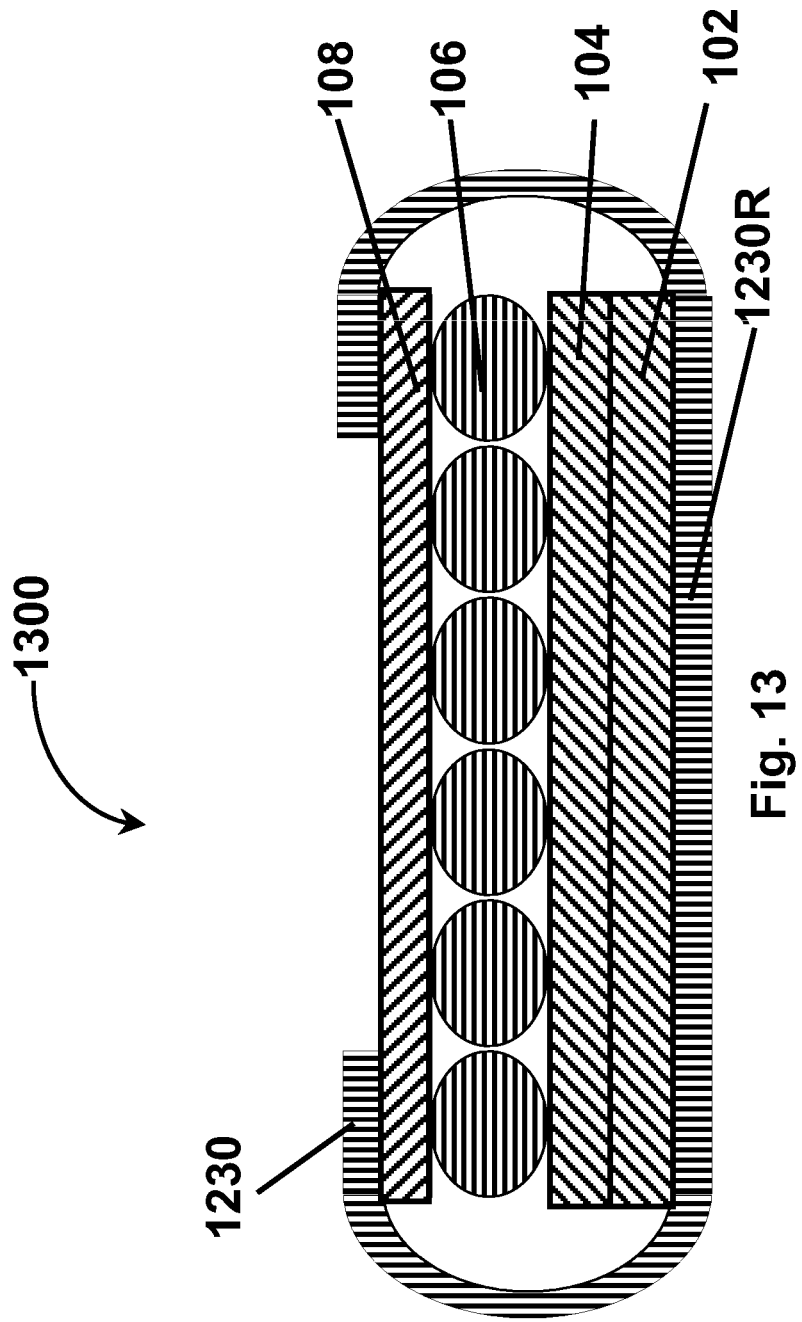
FIG. 13 is a schematic section through a second tape sealed electro-optic display of the present invention in which the tape extends across the rear surface of the backplane.

FIG. 13 is a schematic section through a second tape sealed display (generally designated 1300) which is a modified form of the display 1200 shown in FIG. 12. In the display 1300, the tape 1230 is carried across the entire rear surface of the backplane as a portion designated 1230R. In practice, the display 1300 is normally produced by placing the backplane 102, already carrying the layers 104-108, on to an adhesive barrier sheet, and then folding peripheral portions of the barrier sheet around the edges of the display to form the tape seal.

Figure 14:
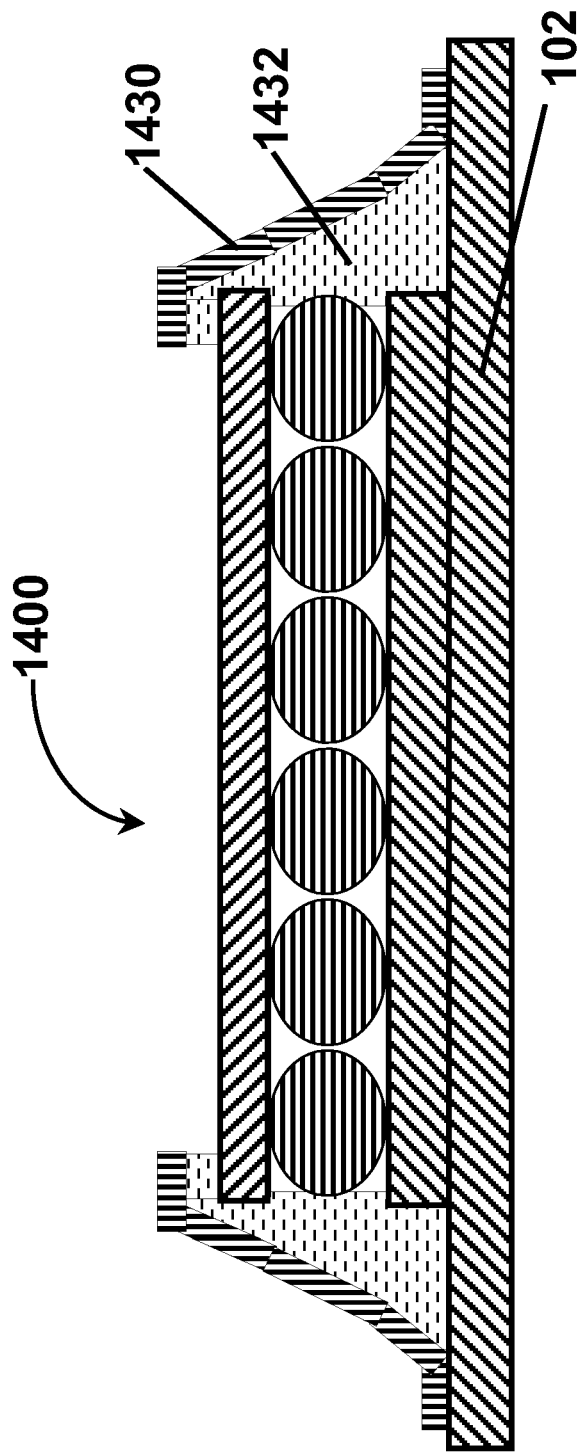
FIG. 14 is a schematic section though a third tape sealed electro-optic display of the present invention.

FIG. 14 is a schematic section through another electro-optic display (generally designated 1400) which may notionally be regarded as a tape sealed display, although in practice it will typically not be produced using a preformed tape. The display 1400 has a backplane 102, lamination adhesive layer, electro-optic layer and front substrate essentially identical to the display 1300 shown in FIG. 13 except that the backplane 102 is enlarged to that a peripheral portion thereof extends beyond the periphery of the other layers. A flexible protective layer or tape 1430 extends from the peripheral portion of the backplane 102 and overlaps the front surface of the front substrate, while a flexible sealant 1432 underlies the tape 1430 and secures the tape to the other parts of the display 1400. Note that the flexible sealant 1432 also overlaps the front surface of the front substrate. In this type of display, it is important that the flexible sealant 1432 as well as the tape 1430 have the desired barrier properties, in particular a low water vapor transmission rate.

In practice, the display 1400 will typically be produced by arranging the backplane, lamination adhesive layer, electro-optic layer and front substrate in their correct relative positions, dispensing a bead of the flexible sealant around the edges of the assembled layers, and applying the flexible tape over the bead of sealing, thereby forming the sealant into the shape shown in FIG. 14.

Figure 15:
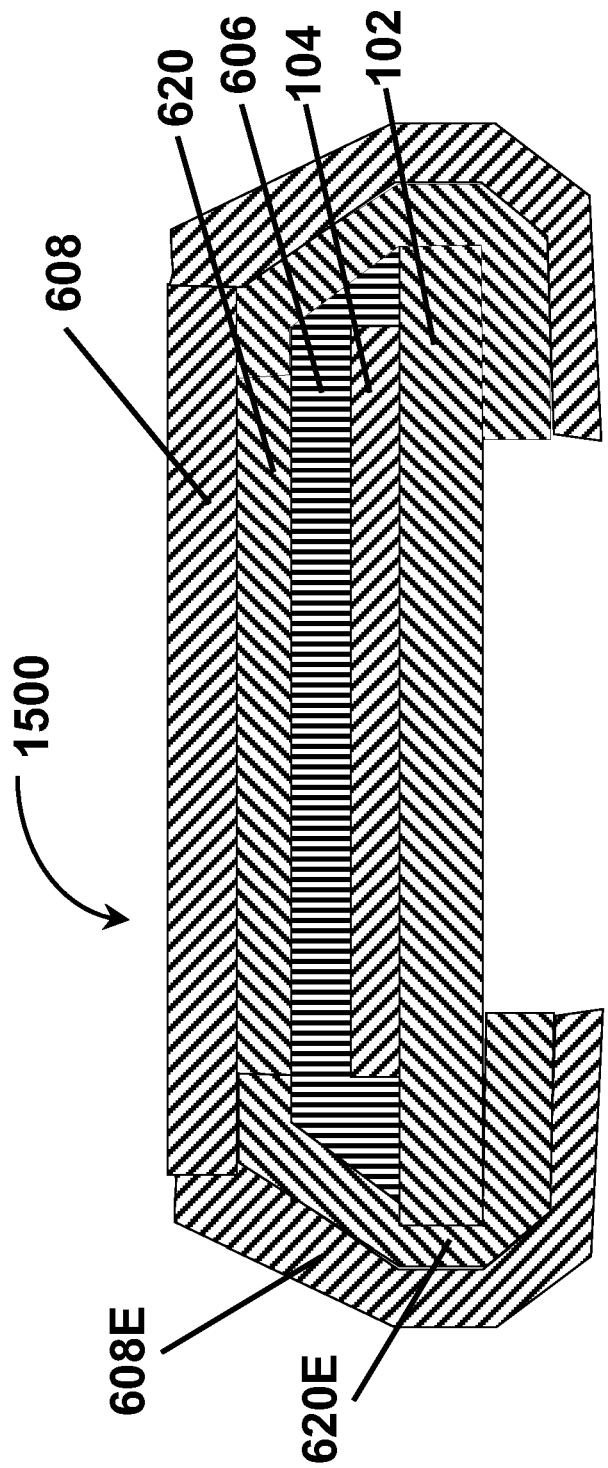
FIG. 15 is a schematic section through a notionally tape sealed electro-optic displays of the present invention in which the tape seal is formed by extensions of the front substrate and adjacent adhesive layer of the display.

Finally, FIG. 15 is a schematic section through another electro-optic display (generally designated 1500) which may notionally be regarded as a tape sealed display, although in practice it will typically not be produced using a preformed tape. The display 1500 may be regarded as a modification of the display 600 shown in FIG. 6, and like the display 600 the display 1500 comprises a backplane 102, a first lamination adhesive layer 104, an electro-optic layer 606, a second lamination adhesive layer 620 and a front substrate 608, although, as will readily be apparent from FIG. 15, the exact forms of these layers differ somewhat from those of the display 600. Most importantly, however, in the display 1500, the front substrate 608 and the second lamination adhesive layer 620 are provided with extensions (designated 608E and 620E respectively) which are wrapped around the edges of the electro-optic layer 606, the first lamination adhesive layer 104 and the backplane 102, so that both extensions overlap a peripheral portion of the rear surface of the backplane 102; thus, the extensions 608E and 620E act to seal the electro-optic display in a manner rather similar to the tape 1230 shown in FIG. 12.

The electrode arrangements in the various types of displays of the present invention can be of any of the types described in the aforementioned E Ink and MIT patents and applications. Thus, for example, the displays may be of the direct drive type, in which the backplane is provided with a plurality of electrodes, each of which is provided with a separate connector by means of a which a controller can control the voltage applied to the specific electrode. In such a direct drive display, a single continuous front electrode is usually provided covering the whole display, although other front electrode arrangements are possible. Depending upon the type of electro-optic material used, it may be possible to use a passive matrix drive arrangement in which (typically) the backplane carries a plurality of elongate parallel electrodes ("column electrodes"), while on the opposed side of the electro-optic material there is provided a plurality of elongate parallel electrodes ("row electrodes") running at right angles to the column electrodes, the overlap between one specific column electrode and one specific row electrode defining one pixel of the display. The present displays may also be of the active matrix type, typically with a single continuous front electrode covering the whole display and a matrix of pixel electrodes on the backplane, each pixel electrode defining one pixel of the display and having an associated transistor or other non-linear element, the active matrix display being scanned in the conventional manner to write the display in a row-by-row fashion. Finally, the present display may also be of the stylus-driven type. with (typically) a single electrode on the backplane and no permanent front electrode, writing of the display being effected by moving a stylus across the front surface of the display.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

Numerous changes and modifications can be made in the preferred embodiments of the present invention already described without departing from the scope of the invention. Accordingly, the foregoing description is to be construed in an illustrative and not in a limitative sense.

The invention claimed is:
1. An electro-optic display comprising:
a backplane comprising at least one electrode;
a layer of electro-optic material disposed adjacent the backplane;
a front substrate disposed on the opposed side of the layer of electro-optic material from the backplane;
a first protective sheet disposed adjacent the front substrate on the opposed side thereof from the layer of electro-optic material; and
a second protective sheet disposed adjacent the backplane on the opposed side thereof from the layer of electro-optic material,
the first and second protective sheets being larger in both dimensions than the front substrate and backplane respectively so as to leave peripheral portions of the first and second protective sheets expending beyond the edges of the front substrate and backplane respectively, the peripheral portions of the first and second protective sheets being secured to each other, thereby sealing the electro-optic display, and the display further comprising a layer of optically clear adhesive between the front substrate and the first protective layer.

2. An electro-optic display according to claim 1 wherein the first and second protective sheets are secured to each other by welding.

3. An electro-optic display according to claim 1 wherein the first and second protective sheets are secured to each other by an adhesive.

4. An electro-optic display according to claim 1 further comprising an adhesive layer between the backplane and the layer of electro-optic material.

5. An electro-optic display according to claim 1 further comprising an adhesive layer between the layer of electro-optic material and the front substrate.

6. An electro-optic display according to claim 1 wherein the electro-optic material comprises a rotating bichromal member or electrochromic material.

7. An electro-optic display according to claim 1 wherein the electro-optic material comprises an electrophoretic material comprising a plurality of electrically charged particles disposed in a fluid and capable of moving through the fluid under the influence of an electric field.

8. An electro-optic display according to claim 7 wherein the electrically charged particles and the fluid are confined within a plurality of capsules or microcells.

9. An electro-optic display according to claim 7 wherein the electrically charged particles and the fluid are present as a plurality of discrete droplets surrounded by a continuous phase comprising a polymeric material.

10. An electro-optic display according to claim 7 wherein the fluid is gaseous.

11. An electronic book reader, portable computer, tablet computer, cellular telephone, smart card, sign, watch, shelf label or flash drive comprising a display according to claim 1.

* * * * *